Feb. 21, 1956   D. L. FREEBAIRN, JR., ET AL   2,735,731
THREE-ELEMENT FLEXURE PIVOT
Filed April 12, 1954

INVENTORS.
DARWIN L. FREEBAIRN, JR.
EUGENE E. KINSEY
BY ABIGAIL E. C. BEUTLER

William R. Lane
ATTORNEY

United States Patent Office 2,735,731
Patented Feb. 21, 1956

2,735,731

THREE-ELEMENT FLEXURE PIVOT

Darwin L. Freebairn, Jr., Whittier, Eugene E. Kinsey, Long Beach, and Abigail E. C. Beutler, Los Angeles, Calif., assignors to North American Aviation, Inc.

Application April 12, 1954, Serial No. 422,436

5 Claims. (Cl. 308—2)

This invention is concerned with a three-element flexure pivot. More particularly this invention is concerned with an improvement of a conventional three-element flexure pivot.

A conventional three-element flexure pivot comprises a base portion having three spring beam elements radiating internally thereof at 120° spacings. One end of each beam element is anchored on the base portion while the other end is anchored around the periphery of a central hub, not unlike the conventional rim, spokes and hub of a bicycle wheel.

Three-element flexure pivots also have been constructed with the beams thereof crossed at their center. In this three-element design the instant center of rotation does not move when the bearing is rotated, the ultimate load capacity is limited only by the tensile strength of the beams, the spring rate is not linear but increases approximately with the third power of the angle, and, although the rotational stiffness of one beam element is sensitive to the direction of the applied transverse load, the effect of three beams placed 120° apart is to cancel out all components of unbalance except the 3rd and 6th harmonics and multiples thereof.

When a three-element pivot whose beams are crossed at their center is rotated from its undeflected position, the beam elements are forced into compression by the foreshortening of their elastic curves thereby changing the longitudinal loading of the beam and hence the spring rate of the bearing. If the beam elements are crossed close enough to the end of the beam the elastic curve is lengthened so that the beam is pulled into tension when the bearing is rotated and again the spring rate changes with angle.

It has been found that an intermediate ratio of R/L exists where R is the straight line distance from the center of rotation to the end of the beam on the base portion and L is the total beam length, for which the change in length with angle of the elastic curve is zero (around the position of nil deflection).

The main object of this invention therefore is to provide a three-element flexure pivot having a linear spring rate.

A further object of this invention is to provide a flexure pivot having fixity of instant center coupled with a linear spring rate.

A still further object of this invention is to provide a beam type flexure pivot in which the beam elements will not fail by compressive buckling.

An additional object of this invention is to provide a flexure pivot having insensitivity to moderate load conditions.

A further object of this invention is to provide a flexure pivot which provides symmetrical support of the rotational axis.

An additional object of this invention is to provide a three-element flexure pivot suitable for use in precision gyros and other scientific instruments.

Other objects of invention will become apparent from the following description taken in connection with the accompanying drawings, in which Fig. 1 represents a plan view of the instant three-element pivot;

Figure 1:
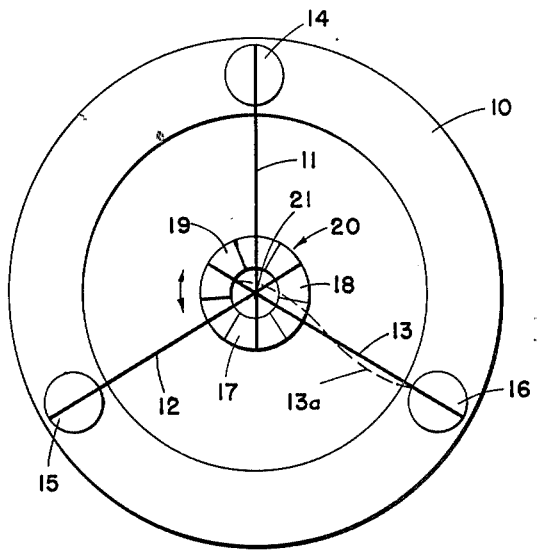
Figure 2:
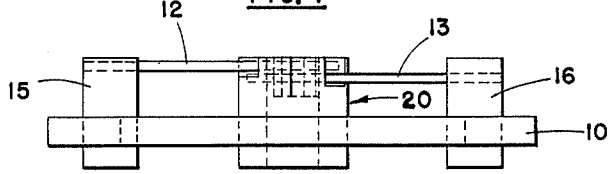
Fig. 2 is a side view of Fig. 1.

The flexure pivot illustrated in Fig. 1 comprises a ring-like base portion 10, three beam spring elements 11, 12, and 13 symmetrically attached to the base 10 at points 14, 15 and 16, a central hub body 20 having upstanding means 17, 18 and 19 to securely anchor the opposite ends of the beam elements 11, 12 and 13, respectively. As seen in Figs. 1 and 2 the beam elements 11, 12 and 13 enable the central body 20 to oscillate with respect to the base rim 10 when a torque is applied to the central body 20. Of paramount importance in this invention is the point 21 where the beams 11, 12 and 13 cross. It has been found that a critical ratio exists for this crossing point 21. It has been found that when the crossing point is 87.3% of the distance of the beam free span between the ring 10 and the central body 20 that the three-element pivot has a linear spring rate. The crossing ratio 87.3% is given more exactly by the formula $$R = 2/3 \left( \frac{L}{3 - \sqrt{5}} \right)$$

The crossing ratio of 87.3% permits the beam elements to bend in such a curve that there is no tendency for the beam elements to elongate or shorten. This makes the pivot approximately linear. Each of the beam elements, when deflected, approximates an S-shaped curve, unlike prior two-element and three-element pivots in which the beam elements will have simple (one-way) curvature. The phantom line 13a shows the curvature of one of the beam elements in the deflected position. It is to be understood that all the beam elements will have a similar curvature.

In addition to having a linear spring rate the particular crossing ratio causes the three-element pivot to be insensitive to moderate load conditions. Use of this ratio further provides symmetric support of the rotational axis, and prevents the beam elements from failing by compressive buckling.

It has further been found that a crossing ratio of from 85% to 90% of the length of the beam element between its supports will approximate the results of the 87.3% crossing ratio. In this range the pivot is nearly linear, less sensitive to load conditions, and has a fixity of instant center of rotation, and the beam elements do not fail by compressive buckling.

Figure 3:
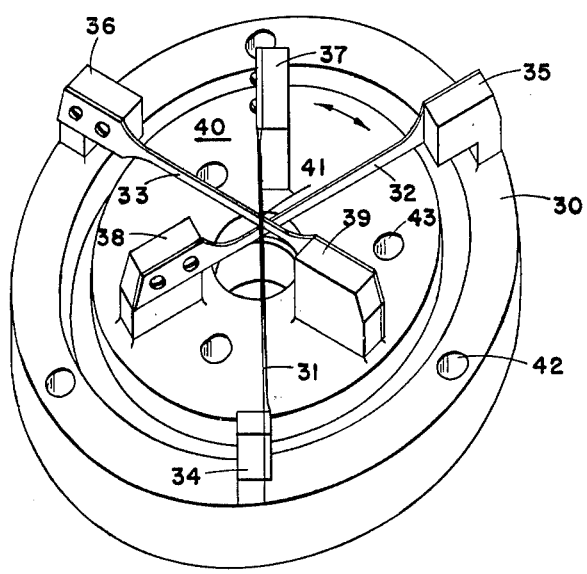
Fig. 3 is a modified form of flexure pivot.

The modification illustrated in Fig. 3 comprises a ring-like base portion 30 having upstanding portions 34, 35 and 36 symmetrically spaced thereon, an oscillatable disc member 40 within the ring 30 and having upstanding portions 37, 38, 39 symmetrically placed thereon and diametrically opposite the corresponding upstanding portions of the ring 30. Beam elements 31, 32 and 33 are placed between diametrically opposite upstanding portions of the ring and disc, respectively, so that the beam elements cross each other at a point 41 from 85% to 90% of the distance between the upstanding means upon the ring 30 and the upstanding means on the disc 40. The optimum value of this crossing point is, as discussed above, 87.3%.

In each of the illustrated figures the base portions and central portions are attached to a fixed member and a member subjected to angular torque. Any torque communicated to the outer ring-like base portion or the central hub or disc portions results in a relative oscillatory movement of the central or hub portions and the outer ring-like base portions. When the crossing ratio is as described and the torque is of a low degree the beam elements will not lengthen nor shorten and the spring rate will approximate a linear condition. In Fig. 3 aperture means 42 and 43 are shown through which an attaching means may be passed for attaching the ring member 30 and disc member 40 to their respective fixed and torque producing supports. In the case of gyro applications the disc 40 would be oscillatory and the means 43 would aid connection of the disc 40 with an inner gimbal of the gyro while the means 42 would aid connection of the ring base portion 30 to an outer gimbal or frame of the gyro. The instant flexure pivot may be used in precision scientific instruments such as inertial distance meters and the like as well as in gyroscope applications.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A flexure pivot comprising a base portion, three symmetrical beam elements attached thereto, and a central body supported by said beam elements, the improvement which comprises having each of the beam elements cross the others 87.3% of the free span distance from one end to the other of said beam elements.

2. In a flexure pivot comprising a base portion, and an oscillatable central member, and three symmetrical beam elements each connecting said portion to said member, the improvement which comprises having each of the beam elements cross the others from 85% to 90% of the free span distance from one end to the other of said beam elements.

3. A flexure pivot comprising a base portion, three beam elements symmetrically attached, each at one end thereof, to said base portion, and a central oscillatable member attached to the other end of each beam element, each of said beam elements crossing the others at a point 85% to 90% of the free span distance from said one end to said other end, said beam elements forming an S-shaped curve upon deflection thereof.

4. A flexure pivot comprising a base portion, three beam spring elements symmetrically attached, each at one end thereof, to said base portion, and an inner oscillatable member attached to the other end of each beam element, each of said beam elements crossing the others at a point 87.3% of the free span distance from said one end to said other end.

5. A flexure pivot comprising a base ring having upstanding portions thereon, three beam spring elements each symmetrically attached at one end to one of said upstanding portions, and an oscillatable disc member within said ring and having corresponding upstanding portions diametrically opposite said first mentioned upstanding portions, the other end of each beam element being symmetrically attached to one of said diametrically opposite last mentioned upstanding portions, each of said beam elements crossing the others at a point centrally of said disc and at 87.3% of the free span distance from said one end to said other end.

References Cited in the file of this patent

UNITED STATES PATENTS

| | | |
|---|---|---|
| Re. 22,330 | Draper | June 8, 1943 |
| 1,622,267 | Alden | Mar. 29, 1927 |
| 1,639,336 | Gannett | Aug. 16, 1927 |
| 2,322,292 | Harrison | June 22, 1943 |
| 2,606,447 | Boltinghouse | Aug. 12, 1952 |
| 2,687,648 | Konet | Aug. 31, 1954 |
| 2,690,014 | Draper et al. | Sept. 28, 1954 |